United States Patent
Mo et al.

(10) Patent No.: US 11,632,672 B2
(45) Date of Patent: Apr. 18, 2023

(54) SYSTEMS AND METHODS TO SUPPORT DATA PRIVACY OVER A MULTI-HOP NETWORK

(71) Applicant: TEXAS INSTRUMENTS INCORPORATED, Dallas, TX (US)

(72) Inventors: Feng L. Mo, Lewisville, TX (US); Jianwei Zhou, Allen, TX (US); Xiaolin Lu, Plano, TX (US); Il Han Kim, Frisco, TX (US); Kaichien Tsai, Allen, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 328 days.

(21) Appl. No.: 16/730,485

(22) Filed: Dec. 30, 2019

(65) Prior Publication Data

US 2021/0204114 A1 Jul. 1, 2021

(51) Int. Cl.
| | | |
|---|---|---|
| H04W 12/041 | (2021.01) | |
| H04W 12/03 | (2021.01) | |
| H04W 40/24 | (2009.01) | |
| H04L 9/08 | (2006.01) | |
| H04L 45/02 | (2022.01) | |
| H04L 45/00 | (2022.01) | |

(52) U.S. Cl.
CPC ........... *H04W 12/03* (2021.01); *H04L 9/0841* (2013.01); *H04L 9/0861* (2013.01); *H04L 45/02* (2013.01); *H04L 45/20* (2013.01); *H04W 12/041* (2021.01); *H04W 40/24* (2013.01)

(58) Field of Classification Search
CPC ... H04W 12/03; H04W 12/04; H04W 12/041; H04W 12/043; H04W 12/0431; H04W 12/06; H04W 12/10; H04W 12/106; H04W 12/006; H04W 12/102; H04W 40/24; H04L 9/08; H04L 9/0894; H04L 9/0861; H04L 9/0836; H04L 9/0838; H04L 9/085; H04L 9/0841; H04L 45/02; H04L 45/20

See application file for complete search history.

(56) References Cited

U.S. PATENT DOCUMENTS

| | | | |
|---|---|---|---|
| 7,793,103 B2 | 9/2010 | Fu et al. | |
| 8,364,964 B2 * | 1/2013 | Medvinsky | ........... H04L 9/0833 380/279 |
| 8,719,564 B2 | 5/2014 | Hong et al. | |
| 8,811,188 B1 | 8/2014 | Bagchi et al. | |
| 8,913,751 B2 | 12/2014 | Du et al. | |

(Continued)

OTHER PUBLICATIONS

Search Report for PCT Patent Application No. PCT/US2020/066530, date of mailing of the international search report dated Mar. 18, 2021, 1 page.

(Continued)

*Primary Examiner* — Shaqueal D Wade-Wright
(74) *Attorney, Agent, or Firm* — Frank D. Cimino (57) ABSTRACT

A multi-hop mesh network includes a root network device and a first network device. The first network device is configured to establish a first direct wireless connection with the root network device and negotiate a first shared secret key with the root network device. The multi-hop network further includes a second network device configured to establish a second direct wireless connection with the first network device and negotiate a second shared secret key with the first network device.

25 Claims, 6 Drawing Sheets

(56) References Cited

U.S. PATENT DOCUMENTS

| | | | |
|---|---|---|---|
| 9,692,604 B2 | 6/2017 | Cordeiro De Oliveira Barros et al. | |
| 11,166,156 B2* | 11/2021 | Jana | H04W 12/04 |
| 2008/0292105 A1* | 11/2008 | Wan | H04L 9/0825 380/282 |
| 2012/0237033 A1* | 9/2012 | Tanaka | H04W 12/06 380/270 |
| 2013/0036305 A1* | 2/2013 | Yadav | H04L 63/12 713/168 |
| 2018/0234388 A1* | 8/2018 | Reddy | H04L 63/0227 |
| 2019/0014094 A1* | 1/2019 | Le Saint | H04L 63/0428 |
| 2019/0268764 A1* | 8/2019 | Wei | H04L 63/126 |

OTHER PUBLICATIONS

Xavier Vilajosana, et al, "IETF 6TiSCH: A Tutorial", 2018.
E. Rescorla et al, "RFC 6347, Datagram Transport Layer Security Version 1.2", Jan. 2012.

* cited by examiner

SYSTEMS AND METHODS TO SUPPORT DATA PRIVACY OVER A MULTI-HOP NETWORK

BACKGROUND

Computing devices communicate over various types of networks. One type of network used to facilitate communication between computing devices is a multi-hop network, such as a mesh network. A multi-hop network includes a root node, a number of intermediate nodes, and one or more leaf nodes. Each leaf node and intermediate node is connected to the root node directly through a physical (e.g., media access control) link or through a physical link to an intermediate node which is in turn connected to the root node either directly through a physical link or through one or more additional intermediate nodes. Each pair of directly connected nodes in the multi-hop network have a so-called parent-child relationship. The child node in a pair of connected nodes associates with the multi-hop network by associating with the parent node of the pair. A particular node in the multi-hop network may be both a child node and a parent node.

A wireless multi-hop network can be eavesdropped through simple radio signal sniffing of packets exchanged between various nodes. To guard against such eavesdropping, the data exchanged between a child node and its parent node over their direct physical link may be encrypted using an encryption key. In some multi-hop networks, the physical link security keys are generated from a pre-shared secret or generated and distributed centrally by a coordinator. The coordinator also manages authentication and authorization of each node that joins the multi-hop network.

However, pre-shared secrets may be compromised, as a result of activities such as hacking, spying, or side-channel attacks. Once the pre-shared secrets are compromised, the network security of the multi-hop network is broken since the eavesdropper can generate the physical link security keys from the known shared secrets. Furthermore, in the case of security keys generated centrally by the coordinator; the distribution of the security keys to a child node and its parent node must be secured. Accordingly, existing multi-hop networks may be vulnerable to various attacks.

SUMMARY

Systems and methods for securing physical links in a multi-hop network are described herein.

In one example, a multi-hop mesh network includes a root network device and a first network device. The first network device is configured to establish a first direct wireless connection with the root network device and negotiate a first shared secret key with the root network device. The multi-hop network further includes a second network device configured to establish a second direct wireless connection with the first network device and negotiate a second shared secret key with the first network device.

In another example, a method includes establishing, at a first network device of a multi-hop network, a first direct wireless connection with a root network device of the multi-hop network. The method further includes negotiating, at the first network device of the multi-hop network, a first shared secret key with the root network device. The method further includes establishing, at a second network device of the multi-hop network, a second direct wireless connection with the first network device. The method further includes negotiating, at the second network device of the multi-hop network, a second shared secret key with the first network device.

In another example, a computer-readable storage device stores instructions executable by a processor to initiate, at a first network device, association with a parent network device of a multi-hop network. The instructions are further executable to negotiate a first shared secret key with the parent network device of the multi-hop network. The instructions are further executable to receive a request to associate with the multi-hop network from a child network device. The instructions are further executable to negotiate a second shared secret key with the child network device, the first shared secret key distinct from the second shared secret key.

BRIEF DESCRIPTION OF THE DRAWINGS

For a detailed description of various examples, reference will now be made to the accompanying drawings in which.

DETAILED DESCRIPTION

Figure 6:
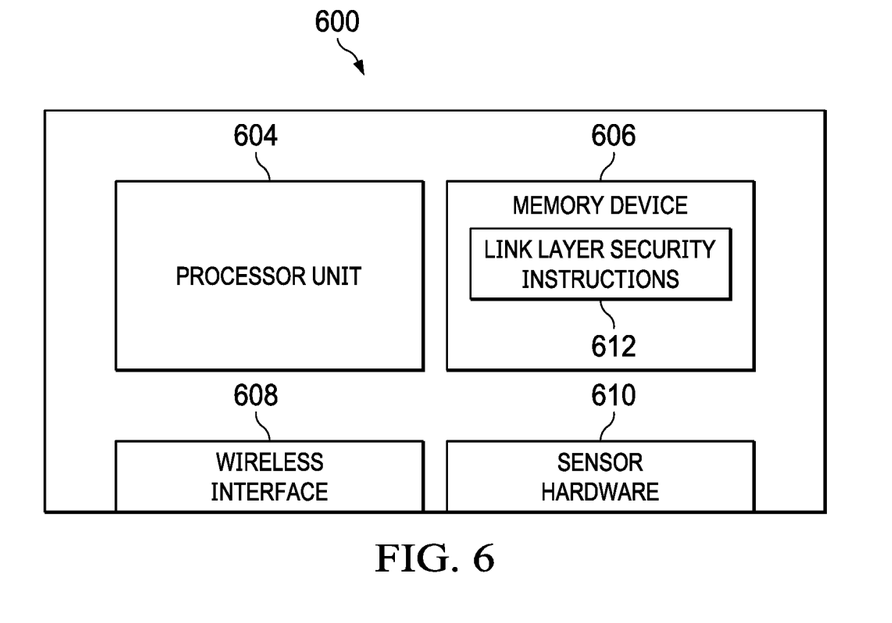
FIG. 6 is a diagram illustrating a computing device that may be used in a multi-hop network with distributed link layer security.
Figure 7:
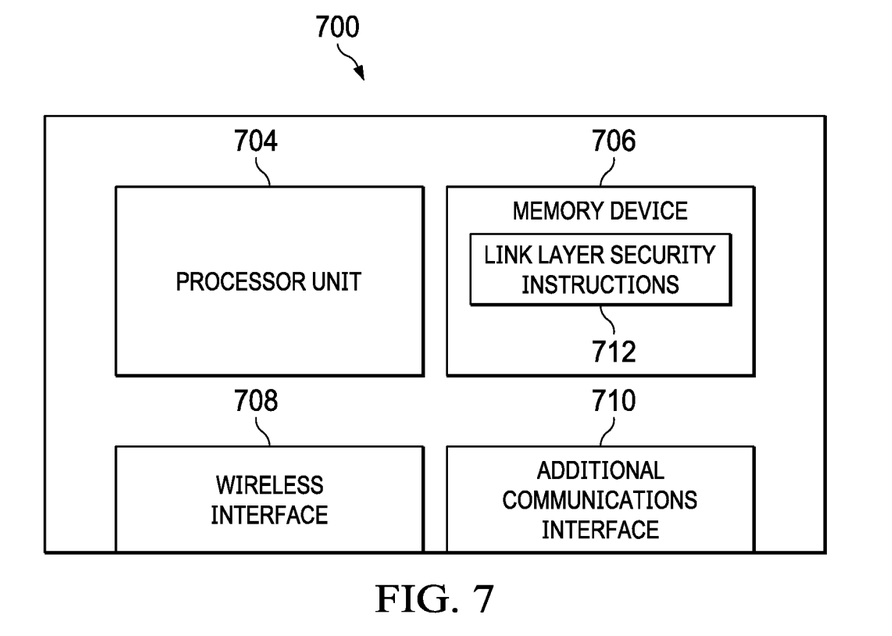
FIG. 7 is a diagram illustrating another computing device that may be used as a root node in a multi-hop network with distributed link layer security.

In this description, a "node" is a network device, such as the computing device of FIG. 6 or FIG. 7.

Figure 1:
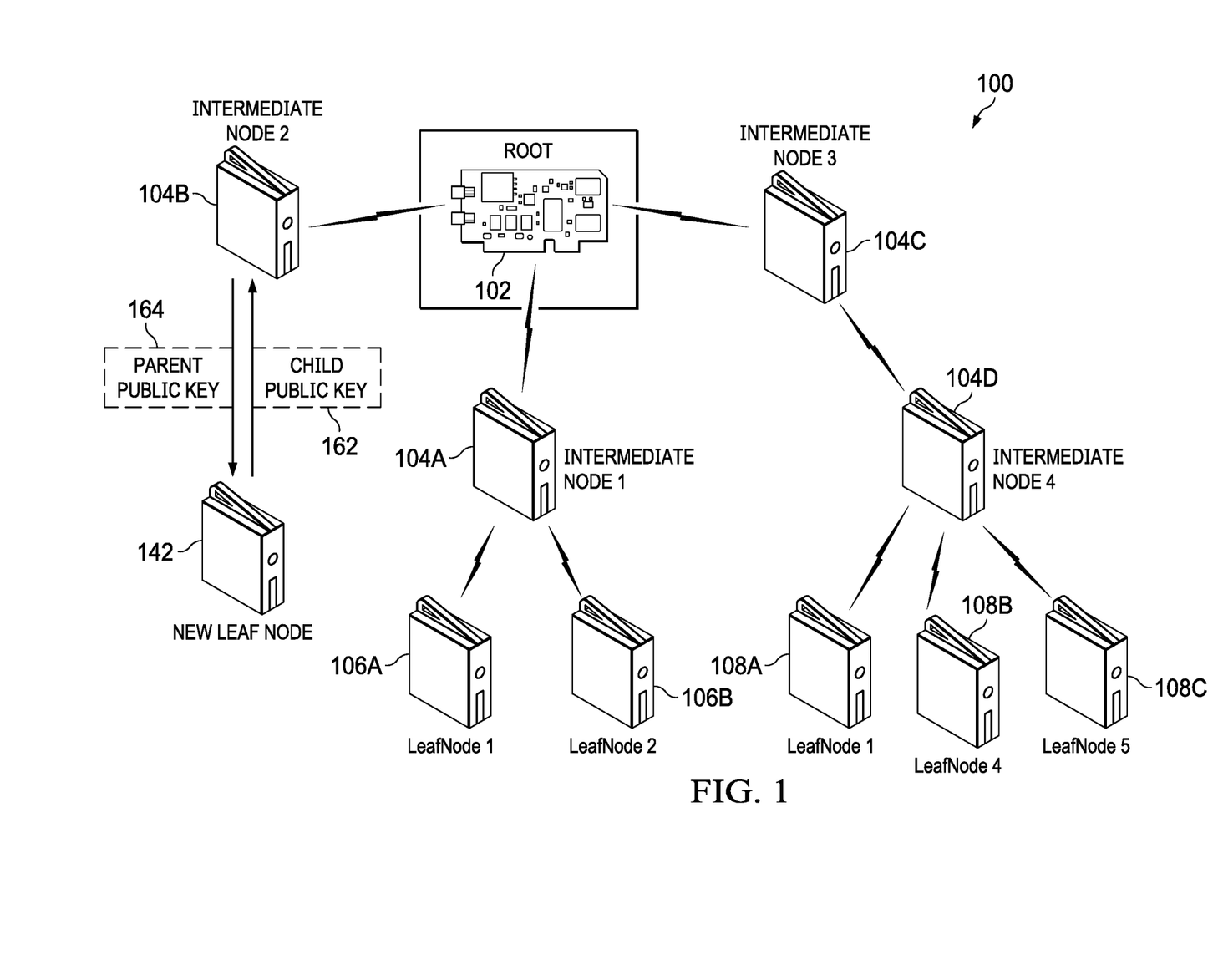
FIG. 1 is an example of a multi-hop network configured to support distributed link layer security.

Referring to FIG. 1, diagram depicting a new leaf node 142 joining a multi-hop network 100 configured to support data privacy is illustrated. The multi-hop network 100 includes a root node 102, a plurality of intermediate nodes 104A-D, a first plurality of leaf nodes 106A-B, and a second plurality of leaf nodes 108A-B. The nodes 102, 104, 106, 108 correspond to computing devices and include components such as controllers (e.g., processor units) and memory devices.

In some implementations, the plurality of intermediate nodes 104A-D, the first plurality of leaf nodes 106A-B, and the second plurality of leaf nodes 108A-C correspond to sensor devices. Each of the plurality of intermediate nodes 104A-D, the first plurality of leaf nodes 106A-B, and the second plurality of leaf nodes 108A-C may correspond to a same type of sensor device or the nodes 104A-D, 106A-B, 108A-C may include different types of sensor devices. Examples of types of sensor devices include humidity sensors, temperature sensors, acceleration sensors, light sensors, sound sensors, current sensors, global positioning system sensors, voltage sensors, wind speed sensors, smoke/gas sensors, rain sensors, etc. In some implementations, a single node of the nodes 104A-D, 106A-B, 108A-C corresponds to a sensor device of more than one type.

A sensor device includes hardware configured to detect an environmental change corresponding to the type (or types) of the sensor device. For example, a node that corresponds to a light sensor includes light sensing hardware, such as a p-n junction semiconductor device configured to convert light photons into current. As another example, an acceleration sensor may include piezoelectric, piezoresistive, or capacitive components configured to convert motion into an electrical signal. As another example, a sound sensor may include a microphone configured to convert sound waves into an electrical signal.

Sensor devices may be part of an Internet-of-things system. In some examples, the nodes 104A-D, 106A-B, 108A-C include one or more sensor devices and one or more other types of Internet-of-things devices, such as a smart light bulb, a smart thermostat, a doorbell, etc.

The root node 102 corresponds to a computing device that includes a memory device and a processor device. In some implementations, the root node 102 corresponds to a sensor device or an Internet-of-things device. The root node 102 corresponds to a hub/gateway device that includes one or more communication interfaces configured to communicate with one or more devices (e.g., the Internet) outside of the multi-hop network 100. For example, the root node 102 may correspond to a device configured to receive sensor data generated by the nodes 104A-D, 106A-B, 108A-C and to transmit the sensor data (or data based on the sensor data) outside of the multi-hop network 100 (e.g., to a user device connected to the Internet).

A first intermediate node 104A, a second intermediate node 104B, and a third intermediate node 104C are directly connected to the root node 102. A fourth intermediate node 104D is directly connected to the third intermediate node 104C. Each of the first plurality of leaf nodes 106A-B is directly connected to a first intermediate node 104A of the plurality of intermediate nodes 104A-104D. Each of the second plurality of leaf nodes 108A-C is directly connected to the fourth intermediate node 104D. The system 100 may have other configurations than the one illustrated in FIG. 1. For example, the system 100 may include a different number of nodes, the nodes may be connected in a different manner, or a combination thereof.

As used herein, "directly connected" means that a physical signal transmitted by one device is received by another device. In the illustrated example, connections between the nodes 102, 104, 106, are wireless, but in other examples, the connections are wired. In examples in which the connections are wireless, the nodes 102, 104, 106 are configured to communicate using an Institute of Electrical and Electronics Engineers (IEEE) 802.11 protocol, an IEEE 802.15.4 protocol (e.g., Zigbee® (Zigbee is a registered trademark of Zigbee Alliance Corporation of San Ramon, Calif.)), or some other wireless protocol and include corresponding hardware (e.g., wireless network controllers). In examples in which the connections are wired, the nodes 102, 104, 106 are configured to communicate using an IEEE 802.3 protocol, a power-line communication protocol (e.g., G3-PLC), or some other wired protocol and include corresponding hardware (e.g., wired network controllers).

New nodes join the multi-hop network 100 by associating with a node that is in the multi-hop network 100. A new node that associates with a node in the multi-hop network 100 becomes a "child" node to the node in the multi-hop network 100. For example, to form the multi-hop network 100 shown in FIG. 1, the intermediate nodes 104A-C each associate with the root node 102. Accordingly, the root node 102 is a parent node for each of the intermediate nodes 104A-C, and each of the intermediate nodes 104A-C is a child node of the root node 102. Similarly, the first plurality of leaf nodes 106A-B associate with the first intermediate node 104A. Thus, each of the first plurality of leaf nodes 106A-B is a child node of the first intermediate node 104A, and the first intermediate node 104A is a parent node of each of the first plurality of leaf nodes 106A-B. While not shown in FIG. 1, a child node may associate with more than one parent node. Once connected to the multi-hop network 100, a node may transmit messages to other nodes of the multi-hop network 100 or to a destination outside of the multi-hop network 100 (e.g., via the root node 102). A message transmitted between two endpoint nodes may traverse several different nodes in the multi-hop network 100. For example, a message from a first leaf node 106A of the first plurality of leaf nodes 106A-B to the root node 102 may be transmitted by the first leaf node 106A of the first plurality of leaf nodes 106A-B to the first intermediate node 104A and may be transmitted from the first intermediate node 104A to the root node 102. A message's traversal of a direct physical connection between two nodes is known as a "hop." The multi-hop network 100 is a so-called "multi-hop" network because a message may traverse several direct physical connections on its way to a destination in the multi-hop network 100.

Prior to transmitting a message (e.g., a network layer packet, an Internet layer packet, etc.) over a physical connection, each node in the multi-hop network 100 is configured to encapsulate the message in a link layer frame (e.g., a WiFi® frame (Wi-Fi is a registered trademark of Wi-Fi Alliance Corp. of Austin, Tex.), an Ethernet frame, a Zigbee frame, etc.). Accordingly, a message traversing the multi-hop network 100 may be encapsulated in one or more link layer frames as the message traverses the multi-hop network 100. For example, a message from a first leaf node 106A of the first plurality of leaf nodes 106A-B to the root node 102 may be encapsulated in a first link layer frame by the first leaf node 106A and transmitted to the first intermediate node 104A. Upon receipt of the first link layer frame, the first intermediate node 104A may remove the message from the first link layer frame, encapsulate the message in a second link layer frame, and transmit the second link layer frame to the root node 102.

Nodes in each parent child pair in the multi-hop network 100 are configured to independently negotiate security parameters (e.g., a shared secret key) to secure the connection (e.g., the link layer) between the parent and the child. Each node is further configured to protect (e.g., encrypt) link layer frames transmitted over a connection based on the security parameters associated with the connection. Accordingly, each link in the multi-hop network 100 is secured by the two nodes that communicate over the link.

An example of this independent negotiation process in which nodes generate a shared secret key by exchanging public keys is illustrated in FIG. 1. In the illustrated example, a new leaf node 142 associates with the second intermediate node 104B (prior to association with the new leaf node 142, the second intermediate node 104B may have been classified as a leaf node). During association, the new leaf node 142 transmits a child public key 162 ($Pub\_key_{child}$). For example, $Pub\_key_{child}$ may be transmitted as part of a request to associate with the second intermediate node 104B. The new leaf node 142 generates $Pub\_key_{child}$ based on a child private key ($Priv\_key_{child}$) randomly generated by the new leaf node 142 and one or more domain parameters. The domain parameters may be set by either of the new leaf node 142 or the second intermediate node 104b and transmitted to the other. In some examples, the second intermediate node 104B periodically transmits a beacon indicating that the second intermediate node 104B is available for communication and the beacon includes the domain parameters. In an example in which the nodes 104B, 142 implement Elliptic-curve Diffie-Hellman exchange, $Pub\_key_{child}$ may be equal to $Priv\_key_{child}$ G, where G is a base point of an elliptic curve and the depicted multiplication operation is an elliptic curve operation. G is an example of a domain parameter. In an example in which the nodes implement Diffie-Hellman key exchange, $Pub\_key_{child}$ may be equal to $g^{Priv\_key_{child}}$ mod p, where p is a prime number and g is a primitive root modulo p. g and p are examples of domain parameters.

In response to receiving the child public key 162 ($Pub\_key_{child}$), the second intermediate node 104b generates a parent public key 164 ($Pub\_key_{parent}$) based on a parent private key ($Priv\_key_{parent}$) randomly generated by the second intermediate node 104B and the one or more domain parameters. In the Elliptic-curve Diffie-Hellman example, $Pub\_key_{parent}$ may be equal to $Priv\_key_{parent}$ G. In the Diffie-Hellman example, $Pub\_key_{parent}$ may be equal to $g^{Priv\_key_{parent}}$ mod p.

The second intermediate node 104b derives a shared secret ($Secret_{shared}$) based on $Priv\_key_{parent}$ and $Pub\_key_{child}$ and generates a shared secret key $Secret\_Key_{shared}$=hash($Secret_{shared}$). In the Elliptic-curve Diffie-Hellman example, $Secret_{shared}$ may be equal to $Priv\_key_{parent}*Pub\_key_{child}$. In the Diffie-Hellman example, $Secret_{shared}$ may be equal to $Pub\_key_{child}^{Priv\_key_{parent}}$ mod p.

The second intermediate node 104B transmits the parent public key 164 $Pub\_key_{parent}$ to the new leaf node 142. In response to receiving $Pub\_key_{parent}$, the new leaf node 142 derives the shared secret ($Secret_{shared}$) based on $Priv\_key_{child}$ and $Pub\_key_{parent}$ and generates the shared secret key $Secret\_Key_{shared}$=hash($Secret_{shared}$). In the Elliptic-curve Diffie-Hellman example, $Secret_{shared}$ may be equal to $Priv\_key_{child}*Pub\_key_{parent}$=$Priv\_key_{parent}*Pub\_key_{child}$. In the Diffie-Hellman example, $Secret_{shared}$ may be equal to $Pub\_key_{parent}^{Priv\_key_{child}}$ mod p=$Pub\_key_{child}^{Priv\_key_{parent}}$ mod p.

Once the shared secret key is derived by both the second intermediate node 104B and the new leaf node 142, link layer frames transmitted a physical connection (e.g., a wireless connection) between the second intermediate node 104B and the new leaf node 142 are protected using the shared secret key. For example, payload portions of linked layer frames transmitted between the second intermediate node 104B and the new leaf node 142 may be encrypted using the shared secret key. In some implementations, the linked layer frames are encrypted in their entirety using the shared secret key. Example encryption algorithms that may be used by the new leaf node 142 and the second intermediate node 104B to encrypt linked layer frames include Advanced Encryption Standard (AES), triple data encryption standard (3DES), etc.

Thus, FIG. 1 depicts an example in which secure physical connections are established between nodes in a multi-hop network in a decentralized fashion. Accordingly, the multi-hop network 100 may be less vulnerable to attacks (e.g., man in the middle attacks) as compared to networks that rely on a central coordinator to distribute encryption keys. Further, the multi-hop network 100 may not require pre-shared keys. In addition, because nodes establish security for each link based on directly exchanged messages, key generation may be accomplished without transmission of multi-hop messages through the multi-hop network 100. Accordingly, network traffic may be reduced.

In some implementations, the multi-hop network 100 corresponds to an IPv6 based mesh network in which a child node exchanges data with its parent using the UDP/IPv6 protocol stack and datagram transport layer security (DTLS) is implemented to secure transport layer (UDP) packets. The DTLS protocol includes a handshake protocol to generate the security keys for encrypting the UDP payload. The DTLS protocol may be modified by the addition of two record layer messages, the CHILD_MAC_KEY_EX-CHANGE (e.g., the parent public key 164) and the PARENT_MAC_KEY_EXCHANGE (e.g., the child public key 162).

After a child node joins the network, it is assigned an IPv6 address by its parent node. The child node then initiates the MAC key exchange process by sending the CHILD_MAC_KEY_EXCHANGE to the parent node through a pre-agreed UDP server port (e.g., UDP port 20224). The parent node, listening on the server port, responds with the PARENT_MAC_KEY_EXCHANGE message which completes the MAC key generation handshake process. Accordingly, link layer security may be provided by a modified version of DTLS.

Figure 2:
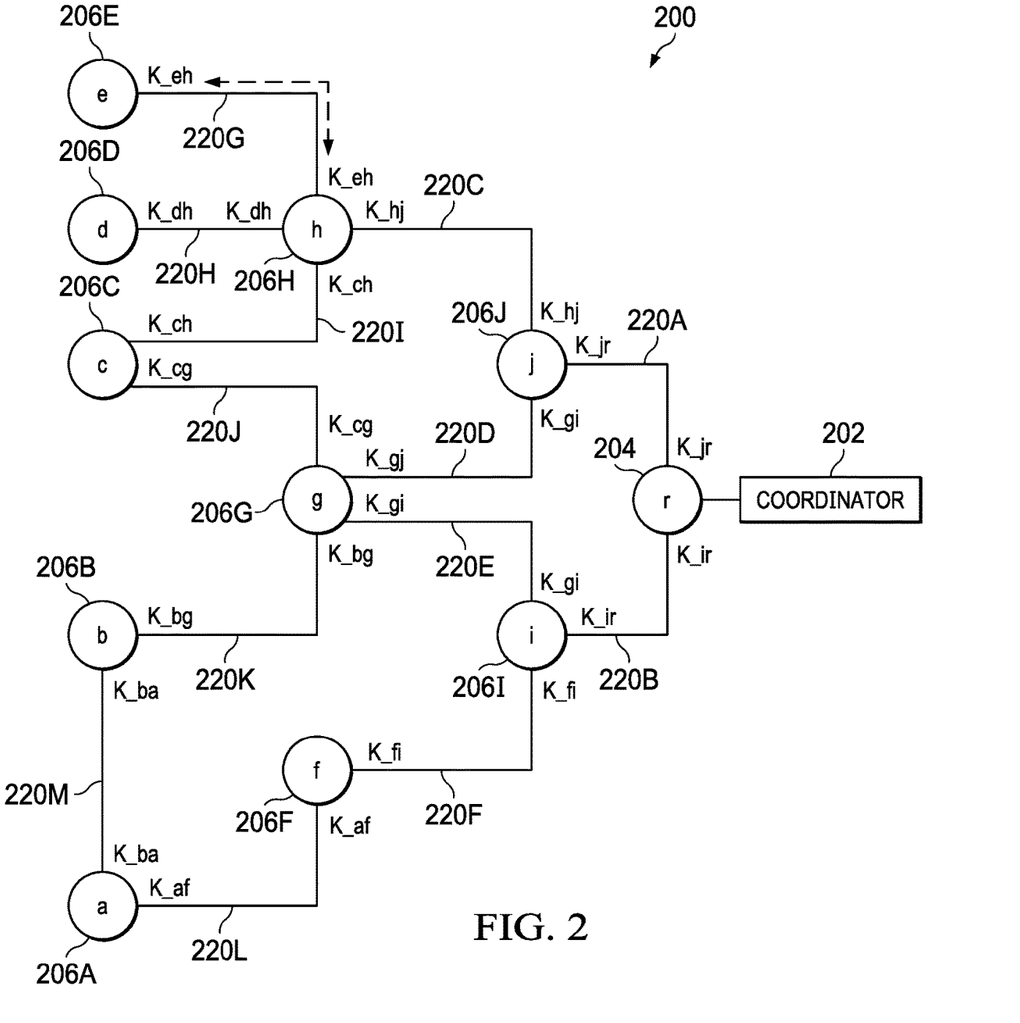
FIG. 2 is an example of a second multi-hop network configured to support distributed link layer security that includes a coordinator for node authentication.

Referring to FIG. 2, a diagram of second multi-hop network 200 configured to support data privacy is illustrated. The second multi-hop network 200 includes a root node 204, a coordinator device 202, and a plurality of nodes 206A-J. The root node 204 is a computing device and may correspond to the root node 102 of FIG. 1. Each of the plurality of nodes 206A-J is a computing device, such a sensor device, and may correspond to one of the nodes 104A-C, 142, 106A-B, 108A-C depicted in FIG. 1. The coordinator device 202 is a computing device configured to authenticate nodes that connect to the second multi-hop network 200.

As described with reference to the multi-hop network 100, each individual node of the plurality of nodes 206A-J and the root node 204 is configured to directly negotiate link layer security with a new node that associates with the individual node. In the illustrated example, a first connection 220A between the root node 204 and a $node_j$ 206J is protected by a shared secret key $k_{jr}$ negotiated between the root node 204 and the $node_j$ 206J. For example, the root node 204 and the $node_j$ 206J may negotiate the shared secret key $k_{jr}$ in response to the $node_j$ 206J associated with the root node 204 and according to the process described with reference to the second intermediate node 104B and the new leaf node 142 of FIG. 1. Linked layer frames transmitted between the root node 204 and the $node_j$ 206J over the first connection 220A are encrypted or partially encrypted by the nodes 204, 206J using the shared secret key $k_{jr}$.

Similarly, a second connection 220B is protected by a shared secret key $k_{ir}$ negotiated between the root node 204 and a $node_i$ 206I; a third connection 220C is protected by a shared secret key $k_{hj}$ negotiated between the $node_j$ 206J and a $node_h$ 206H; a fourth connection 220D is protected by a shared secret key $k_{gj}$ negotiated between a $node_g$ 206G and the $node_j$ 206J; a fifth connection 220E is protected by a shared secret key $k_{gi}$ negotiated between the $node_g$ 206G and the $node_i$ 206I; a sixth connection 220F is protected by a shared secret key $k_{fi}$ negotiated between a $node_f$ 206F and the $node_i$ 206I; a seventh connection 220G is protected by a shared secret key $k_{eh}$ negotiated between a $node_e$ 206E and the $node_h$ 206H; an eighth connection 220H is protected by a shared secret key $k_{dh}$ negotiated between a $node_d$ 206D and the $node_h$ 206H; a ninth connection 220I is protected by a shared secret key $k_{ch}$ negotiated between a $node_c$ 206c and the $node_h$ 206H; a tenth connection 220J is protected by a shared secret key $k_{cg}$ negotiated between the $node_h$ 206C and the $node_g$ 206G; an eleventh connection 220K is protected by a shared secret key $k_{bg}$ negotiated between a $node_b$ 206B and the $node_g$ 206G; a twelfth connection 220L is protected by a shared secret key $k_{af}$ negotiated between a $node_a$ 206A and the $node_f$ 206F; and a thirteenth connection 220M is protected by a shared secret key $k_{ba}$ negotiated between the $node_b$ 206B and the $node_a$ 206A. Accordingly, each physical link between two nodes in the second multi-hop network 200 is protected using a shared secret key negotiated between those two directly connected nodes.

Keys are negotiated and the links 220A-M are secured independently of (and in some examples, prior to) an authentication process carried about by the coordinator 202. For example, the $node_d$ may associate with the $node_h$ and negotiate the key $k_{dh}$ with the $node_h$ independently of whether the $node_d$ has been authenticated by the coordinator 202. In some implementations, a key shared by a parent and a child may be renegotiated in response to a request generated by either the parent or the child. For example, the $node_f$ 206F and the $node_i$ 206I may renegotiate the $k_{fi}$ in response to a request from either the $node_f$ 206F or the $node_i$ 206I.

Upon associating with the second multi-hop network 200, a node may have limited access to network services pending authentication by the coordinator device 202. For example, the root node 204 may not forward messages received from an unauthenticated node outside of the second multi-hop network 200. In some implementations, a new node transmits an authentication request to the coordinator 202 in response to successfully associating with the second multi-hop network 200 (e.g., in response to negotiating a secret shared key with a parent node). Because all links between the new node and the coordinator device 202 independently protected by link layer encryption, authentication messages exchanged between the coordinator device 202 and the new node may be protected from packet sniffing.

Figure 3:
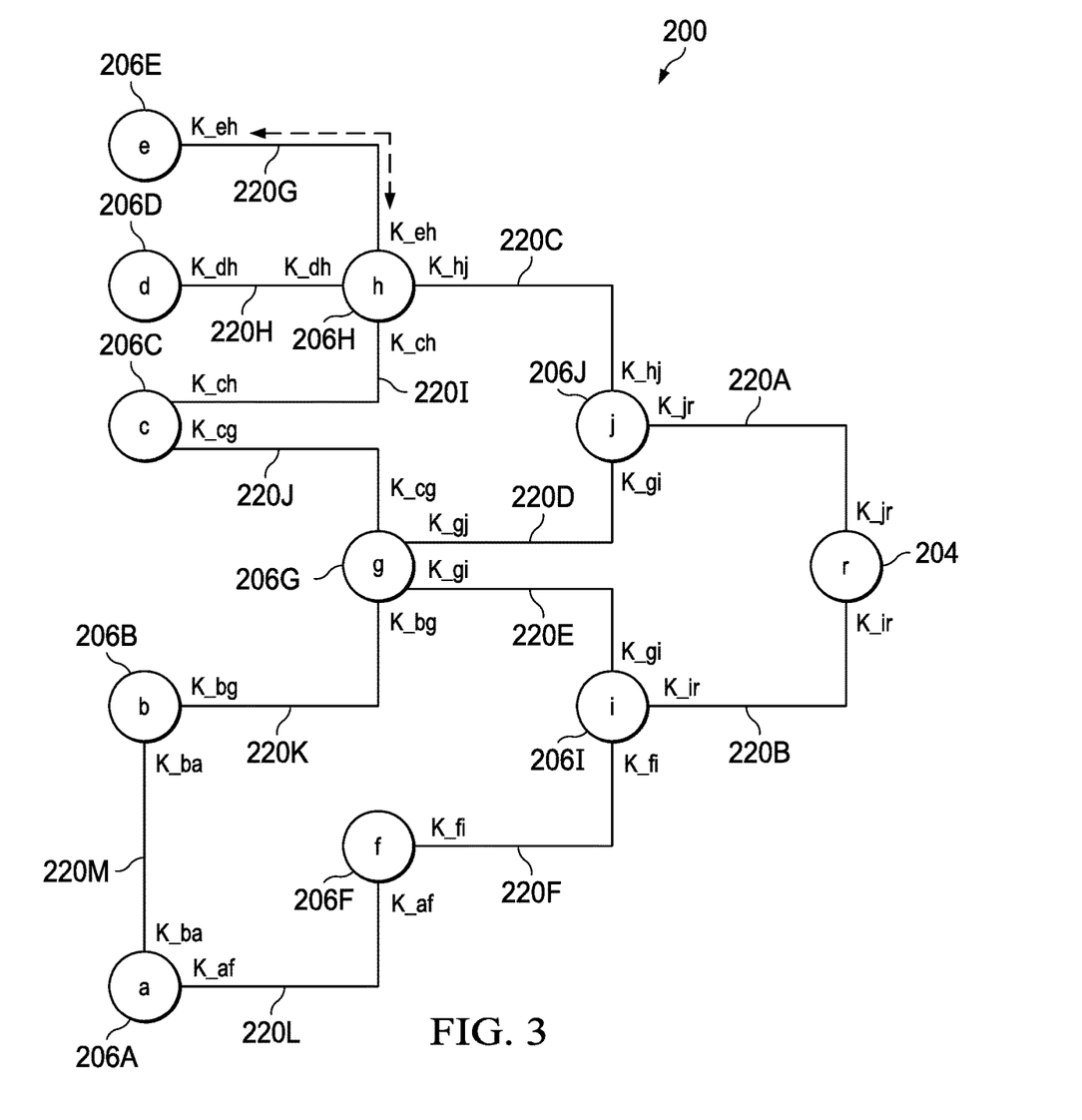
FIG. 3 is an example of the second multi-hop network configured to support distributed link layer security in which the second multi-hop network does not include the coordinator.

Some multi-hop networks configured to support data privacy as described herein may not include a coordinator. For example, FIG. 3 illustrates an alternative example of the second multi-hop network 200 that does not include the coordinator device 202.

Figure 4:
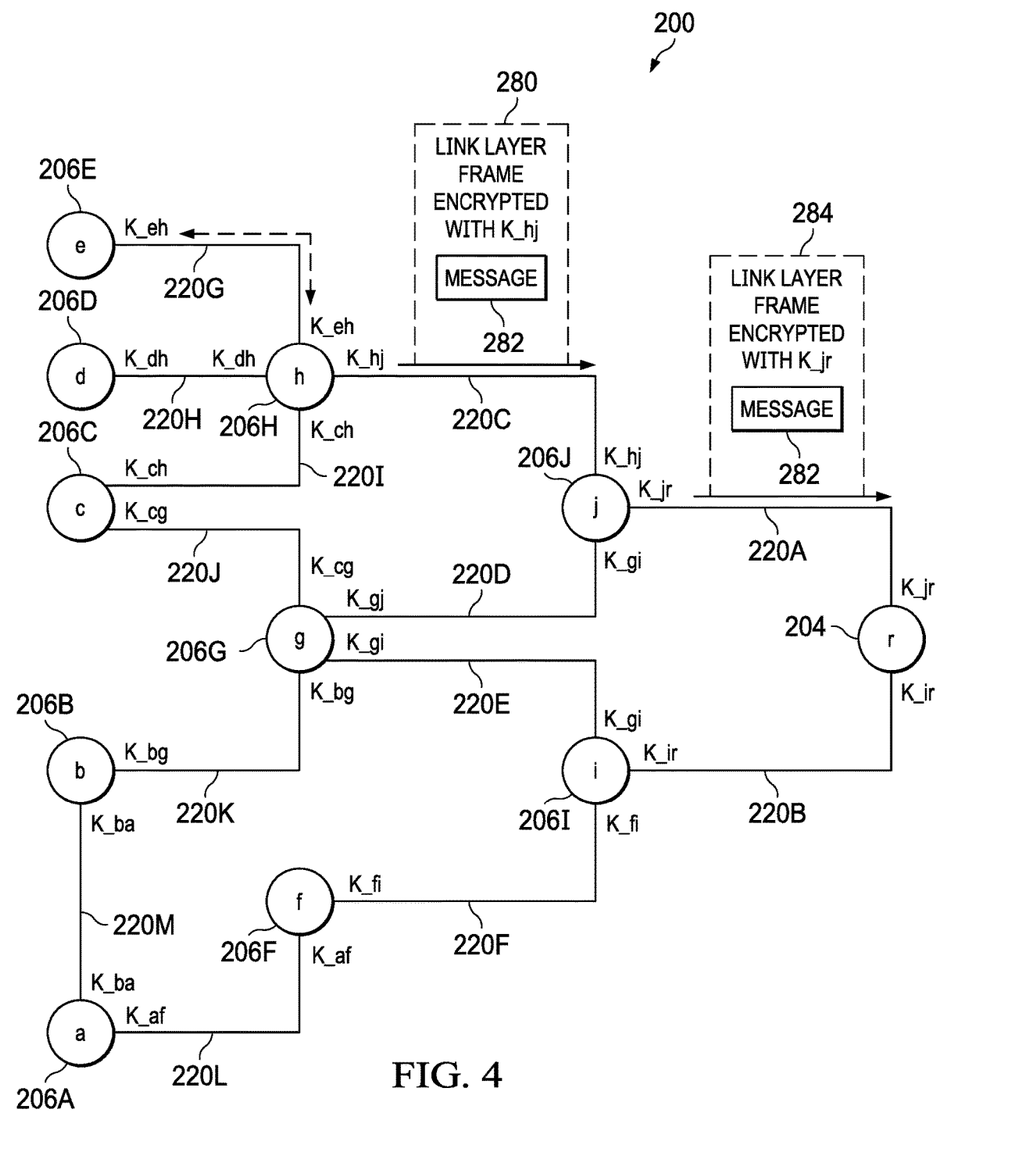
FIG. 4 is a diagram illustrating messages traversing the second multi-hop network and protected by distributed link layer security.

Referring to FIG. 4, a diagram depicting nodes in the second multi-hop network 200 transmitting a message 282 (e.g., a network layer packet, an Internet layer packet, etc.) over several physical connections is shown. In some implementations the message 282 includes sensor data. For example, as described above the nodes 206A-J may include sensor devices configured to generate sensor data and send the sensor data to the root node 204. In the illustrated example, the $node_h$ 206H generates the message 282 (e.g., a packet including sensor data) and encapsulates the message 282 in a link layer frame (e.g., a Wi-Fi frame, etc.). The $node_h$ 206H encrypts the link layer frame using the private key $k_{hj}$ shared between the $node_h$ 206H and the $node_j$ 206H to generate a first encrypted link layer frame 280. The $node_h$ 206H then transmits the first encrypted link layer frame 280 to the $node_j$ 206J.

The $node_j$ 206J receives the first encrypted link layer frame 280 and decrypts the first encrypted link layer frame 280 using the private key $k_{hj}$. In response to determining that the message 282 is addressed to the root node 204, the $node_j$ 206J encapsulates the message 282 in a second link layer frame addressed to the root node 204. The $node_j$ 206J encrypts the second link layer frame using the private key $k_{jr}$ shared between the $node_j$ 206J and the root node 204 to generate a second encrypted link layer frame 284 and transmits the second encrypted link layer frame 284 to the root node 204. Accordingly, the message 282 is protected at the link layer over each hop of the multi-hop network 200. Further, the protection of the message 282 at each hop is negotiated in a distributed fashion as described above.

Figure 5:
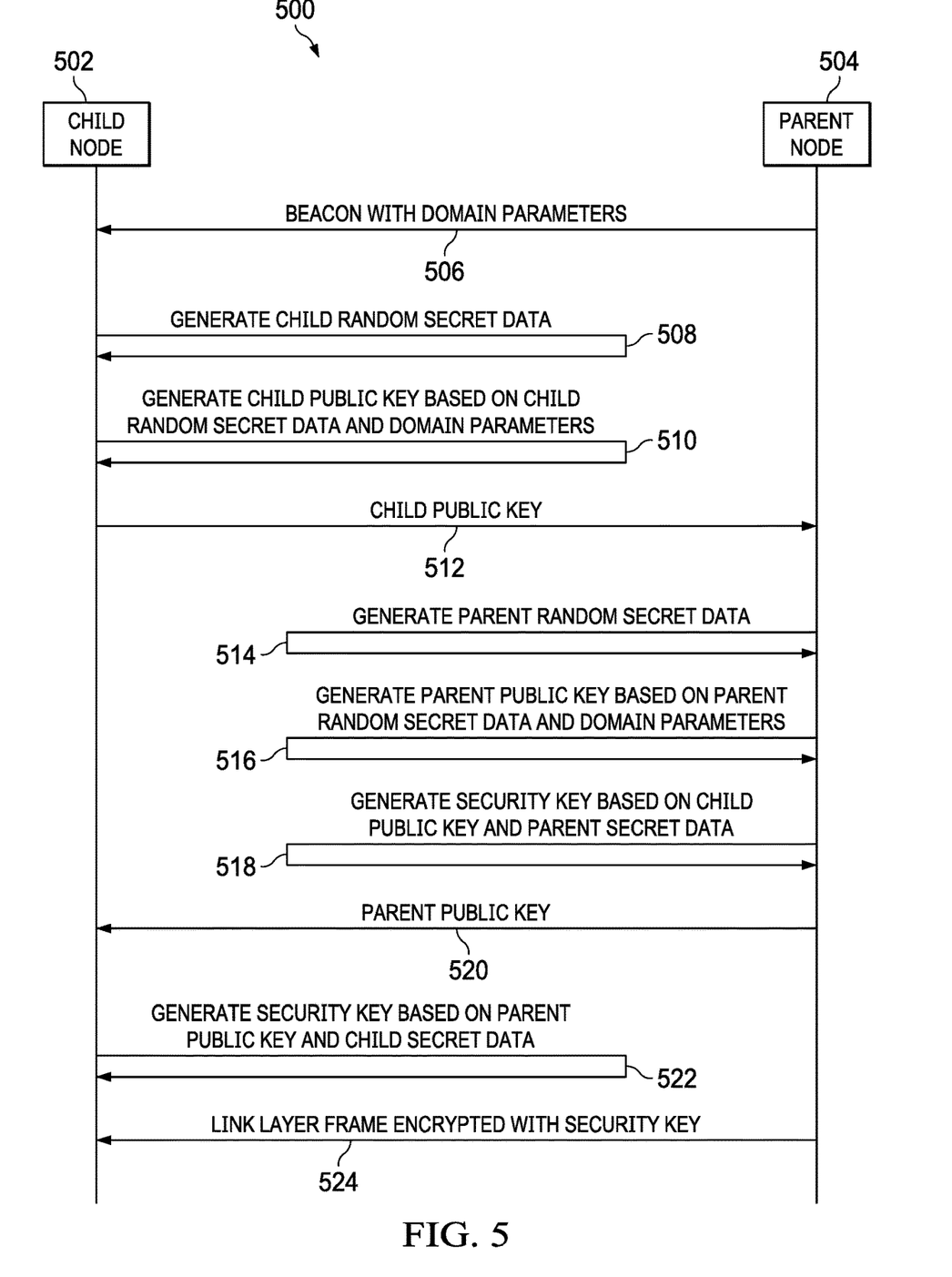
FIG. 5 is a diagram depicting a method of providing distributed link layer security in a multi-hop network.

Referring to FIG. 5, a sequence diagram illustrating a method 500 for securing a link in a multi-hop network is shown. The method 500 may be performed by any two nodes in a multi-hop network, such as the multi-hop network 100 or the second multi-hop network 200. In particular, the method 500 may be performed between every parent-child node pair in a multi-hop network such that each link in the multi-hop network is protected. The method 500 may be performed as part of an association process between a parent node (e.g., a node connected to a multi-hop network) and a child node (e.g., a node requesting to connect to the multi-hop network through the parent node). The method 500 is depicted as being performed between an illustrative child node 502 and an illustrative parent node 504. The parent-child relationship between the parent node 504 and the child node 502 may be established as a result of an association process that includes the method 500.

At 506, the method 500 includes the parent node 504 transmitting a beacon with domain parameters to the child node 502. In an illustrative example, the second intermediate node 104B transmits a beacon including domain parameters, such as a prime number "p", a primitive root modulo p "g", a base point G of an elliptic curve, or a combination thereof. The beacon may advertise availability of the multi-hop network 100 and may include various other information, such as a MAC address of the second intermediate node 104B.

At 508, the child node 502 generates child random secret data. In the illustrative example, the new leaf node 142 generates a random child private key ($Priv\_key_{child}$).

At 510, the child node 502 generates a child public key based on the child random secret data and the domain parameters. In the illustrative example, the new leaf node 142 generates $Pub\_key_{child}=Priv\_key_{child}*G$ or $Pub\_key_{child}=g^{Priv\_key_{child}}$ mod p. In other examples, different key generation techniques may be used.

At 512, the child node 502 sends the child public key to the parent node 504. In the illustrative example, the new leaf node 142 sends the child public key 162 (e.g., $Pub\_key_{child}$) to the second intermediate node 104B. In some examples, the child public key 162 is included in a request to associate with the parent node 504.

At 514, the parent node 504 generates parent random secret data in response to receiving the child public key. In the illustrative example, the second intermediate node 104B randomly generates $Priv\_key_{parent}$ in response to receiving the child public key 162.

At 516, the parent node 504 generates a parent public key based on the parent random secret data and the domain parameters. In the illustrative example, the second intermediate node 1046 generates $Pub\_key_{parent}=Priv\_key_{parent}*G$ or $Pub\_key_{parent}=g^{Priv\_key_{parent}}$ mod p. In other examples, different key generation algorithms may be used.

At 518, the parent node 504 generates a shared security key based on the child public key and the parent secret data. In the illustrative example, the second intermediate node 1046 generates $Secret_{shared}=Priv\_key_{parent}*Pub\_key_{child}$ or $Secret_{shared}=Pub\_key_{child}^{Priv\_key_{parent}}$ mod p. $Secret_{shared}$ may be used as the shared security key or $Secret\_Key_{shared}$=hash($Secret_{shared}$) may be used as the shared security key.

At 520, the parent node 504 sends the parent public key to the child node 502. In the illustrative example, the second intermediate node 104B sends the parent public key 164 (e.g., $Pub\_key_{parent}$) to the new leaf node 142. The parent public key 164 may be included in an acknowledgement message.

At 522, the child node 502 generates the shared security key based on the parent public key and the child secret data. In the illustrative example, the second intermediate node 104B generates $Secret_{shared}=Priv\_key_{child}*Pub\_key_{parent}$ or $Secret_{shared}=Pub\_Key_{parent}^{Priv\_key_{child}} \mod p$. $Secret_{shared}$ may be used as the shared security key or $Secret\_Key_{shared}=hash(Secret_{shared})$ may be used as the shared security key.

At 524, any link layer frames transmitted between the child node 502 and the parent node 504 are encrypted (and decrypted) using the shared security key. In the illustrated example, the new leaf node 142 may encrypt a link layer frame using $Secret\_Key_{shared}$ and an encryption algorithm, such as AES, and transmit the encrypted link layer frame to the second intermediate node 104B.

As explained above, the method 500 may be performed between every parent-child pair of nodes in a multi-hop network. For example, each of the connections 220A-M in the second multi-hop network 200 may be secured according to the method 500. To illustrate, the $node_e$ 206E and the $node_h$ may generate the shared secret key $k_{eh}$ according to the method 500. In such an example, the $node_e$ 206E may correspond to the child node 502 and the $node_h$ 206H may correspond to the parent node 504. As another example, the $node_h$ 206H and the $node_j$ may generate the shared secret key $k_{hj}$ according to the method 500. In such an example, the $node_h$ 206H may correspond to the child node 502 and the $node_j$ 206J may correspond to the parent node 504. Thus, the method 500 may be performed repeatedly within a multi-hop network (e.g., upon association between each pair of nodes in the multi-hop network) to secure each link in the multi-hop network.

Referring to FIG. 6, a block diagram of a computing device 600 configured to support a secured multi-hop network is shown. The computing device 600 includes a processor unit 604. The processor unit 604 may include one or more central processor units, one or more other processor devices, or a combination thereof. The computing device 600 further includes a memory device 606. The memory device 606 includes computer readable storage device, such as a random access memory device, a read only memory device, a solid state memory device, or other type of computer memory device. As used herein, a computer readable storage device refers to an article of manufacture and not to a transitory signal. In some implementations, the processor unit 604 and the memory device 606 are part of a microcontroller device included within the computing device 600.

The memory device 606 stores link layer security instructions 612 executable by the processor unit 604 to perform any of the operations described herein with reference to FIGS. 1-5. For example, the link layer security instructions 612 may be executable by the processor unit 604 to perform the method 500 (or a portion thereof).

The computing device 600 further includes a wireless interface 608. The wireless interface 608 includes, a Wi-Fi interface, a Zigbee interface, some other type of wireless communication interface, or a combination thereof. The wireless interface 608 is configured to receive link layer frames from and transmit link layer frames to one or more other computing devices over a wireless spectrum. The processor unit 604 is configured to execute the link layer security instructions 612 to establish a security key for each link layer connection established over the wireless interface 608 and to encrypt and decrypt the link layer frames transmitted and received through the wireless interface 608.

The computing device 600 further includes sensor hardware 610. The sensor hardware 610 includes hardware configured to detect an environmental change. For example, the sensor hardware 610 may include a light sensor, an acceleration sensor, a sound sensor, another type of sensor, or a combination thereof.

The computing device 600 may be arranged differently than the depiction shown in FIG. 6. For example, in some implementations, one or both of the processor unit 604 and the memory device 606 is a component of the wireless interface 608 rather than a distinct component. In some implementations, one or more of the processor unit 604, the memory device 606, the wireless interface 608, and the sensor hardware 610 is included in a system on a chip circuit. Further, the computing device 600 may include more components than illustrated. In some implementations, the computing device 600 includes fewer components than illustrated. For example, the computing device 600 may not include the sensor hardware 610.

The computing device 600 may correspond to any of the nodes 102, 104A-D, 106A-B, 108A-C, 142 depicted in FIG. 1, any of the nodes 204, 206A-i depicted in FIGS. 2-4, or any of the nodes 502, 504 shown in FIG. 5. Thus, FIG. 6 illustrates an example of a computing device that may implement link layer security in a multi-hop network.

Referring to FIG. 7, a block diagram of a second computing device 700 configured to support a secured multi-hop network is shown. The second computing device 700 may correspond to a root node in a multi-hop network in implementations in which the multi-hop network includes a root node that is different from other nodes in the multi-hop network.

The second computing device 700 includes a processor unit 704, a memory device 706, and a wireless interface 708. The processor unit 704 may be analogous to the processor unit 604 of FIG. 6, the memory device 706 may be analogous to the memory device 606 of FIG. 6, and the wireless interface 708 may be analogous to the wireless interface 608 of FIG. 6. The memory device 706 stores link layer security instructions 712 executable by the processor unit 704 to perform any of the operations described herein with respect to FIGS. 1-5. Accordingly, the link layer security instructions 712 are executable to provide link layer security.

The second computing device 700 further includes an additional communications interface 710. The additional communications interface may be configured to connect to a computing network, such as the Internet. The second computing device 700 may be configured to relay messages between a network connected to the additional communications interface 710 and a multi-hop network connected to the wireless interface 708.

In some implementations, the second computing device 700 corresponds to the root node 102 or to the root node 204. Thus, FIG. 7 illustrates another example of a computing device that may implement link layer security in a multi-hop network.

"The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A."

Modifications are possible in the described embodiments, and other embodiments are possible, within the scope of the claims.

What is claimed is:

1. An apparatus comprising:
a network interface; and
circuitry coupled to the network interface, in which the circuitry is configured to:
  establish a first wireless connection that directly connects the network interface to a first network device;
  establish a second wireless connection that directly connects the network interface to a second network device;
  receive a first public key from the first network device via the first wireless connection;
  generate a first security key based on the first public key and a private key;
  receive a second public key from the second network device via the second wireless connection;
  generate a second security key based on the second public key and the private key of the apparatus;
  perform at least one of a first encryption operation or a first decryption operation using the first security key; and
  perform at least one of a second encryption operation or a second decryption operation using the second security key.

2. The apparatus of claim 1, wherein the circuitry is configured to execute the set of instructions to:
  receive a first encrypted link layer frame encapsulating a first message from the first network device via the first wireless connection;
  extract the first message by performing the first decryption operation on the first encrypted link layer frame using the first security key;
  encapsulate a second message in a second link layer frame;
  generate a second encrypted link layer frame by performing the first encryption operation on the second link layer frame using the first security key; and
  transmit the second encrypted link layer frame encapsulating the second message to the first network device via the first wireless connection.

3. The apparatus of claim 2, wherein the circuitry is configured to:
  encapsulate the first message in a third link layer frame;
  generate a third encrypted link layer frame by performing the second encryption operation on the third link layer frame using the second security key;
  transmit the third encrypted link layer frame encapsulating the first message to the second network device via the second wireless connection;
  receive a fourth encrypted link layer frame encapsulating the second message from the second network device via the second wireless connection; and
  extract the second message by performing the second decryption operation on the fourth encrypted link layer frame using the second security key.

4. The apparatus of claim 1, wherein the circuitry is configured to:
  generate a third public key from the private key and based on an Elliptic Curve Diffie-Hellman key exchange algorithm; and
  transmit the third public key to the first and second network devices via the respective first and second wireless connections.

5. The apparatus of claim 1, wherein the first and second wireless connections are part of a multi-hop mesh network.

6. The apparatus of claim 2, wherein the first message includes sensor data.

7. The apparatus of claim 6, wherein the sensor data are from a sensor device including a humidity sensor, a temperature sensor, acceleration sensor, light sensor, sound sensor, current sensor, global positioning system sensor, voltage sensor, or a combination thereof.

8. The apparatus of claim 1,
wherein the circuitry is configured to execute the set of instructions to establish the first and second wireless connections by transmitting a beacon via the network interface.

9. The apparatus of claim 8, wherein the beacon includes a parameter; and
wherein the first and second public keys are generated based on the parameter.

10. The apparatus of claim 1, wherein the circuitry is configured to:
  perform the at least one of the first encryption operation or the first decryption operation using the first security key on first data transmitted over the first wireless connection; and
  perform the at least one of the second encryption operation or the second decryption operation using the second security key on second data transmitted over the second wireless connection.

11. A method comprising:
  establishing a first wireless connection that directly connects a network interface to a first network device;
  establishing a second wireless connection that directly connects the network interface to a second network device;
  receiving a first public key from the first network device via the first wireless connection;
  generating a first security key based on the first public key and a private key;
  receiving a second public key from the second network device via the second wireless connection;
  generating a second security key based on the second public key and the private key;
  performing at least one of a first encryption operation or a first decryption operation using the first security key; and
  performing at least one of a second encryption operation or a second decryption operation using the second security key.

12. The method of claim 11, further comprising:
  receiving a first encrypted link layer frame encapsulating a first message from the first network device via the first wireless connection;
  extracting the first message by performing the first decryption operation on the first encrypted link layer frame using the first security key;
  encapsulating a second message in a second link layer frame;
  generating a second encrypted link layer frame by performing the first encryption operation on the second link layer frame using the first security key; and transmitting the second encrypted link layer frame encapsulating the second message to the first network device via the first wireless connection.

13. The method of claim 12, further comprising:
encapsulating the first message in a third link layer frame;
generating a third encrypted link layer frame by performing the second encryption operation on the third link layer frame using the second security key;
transmitting the third encrypted link layer frame encapsulating the first message to the second network device via the second wireless connection;
receiving a fourth encrypted link layer frame encapsulating the second message from the second network device via the second wireless connection; and
extracting the second message by performing the second decryption operation on the fourth encrypted link layer frame using the second security key.

14. The method of claim 11, further comprising:
generating a third public key from the private key and based on an Elliptic Curve Diffie-Hellman key exchange algorithm; and
transmitting the third public key to the first and second network devices via the respective first and second wireless connections.

15. The method of claim 11, wherein the first and second wireless connections are part of a multi-hop mesh network.

16. The method of claim 12, wherein the first message includes sensor data.

17. The method of claim 16, wherein the sensor data includes data generated by a humidity sensor, a temperature sensor, acceleration sensor, light sensor, sound sensor, current sensor, global positioning system sensor, voltage sensor, or a combination thereof.

18. The method of claim 11, wherein:
performing at least one of a first encryption operation or a first decryption operation using the first security key comprises performing the at least one of the first encryption operation or the first decryption operation using the first security key on first data transmitted over the first wireless connection; and
performing at least one of a second encryption operation or a second decryption operation using the second security key comprises performing the at least one of the second encryption operation or the second decryption operation on second data transmitted over the second wireless connection.

19. A non-transitory computer-readable medium storing instructions that, when executed by a processor, causes the processor to:
establish a first wireless connection that directly connects a network interface to a first network device;
establish a second wireless connection that directly connects the network interface to a second network device;
receive a first public key from the first network device via the first wireless connection;
generate a first security key based on the first public key and a private key;
receive a second public key from the second network device via the second wireless connection;
generate a second security key based on the second public key and the private key;
perform at least one of a first encryption operation or a first decryption operation using the first security key; and
perform at least one of a second encryption operation or a second decryption operation using the second security key.

20. The non-transitory computer-readable medium of claim 19, further comprising instructions that, when executed by the processor, causes the processor to:
receive a first encrypted link layer frame encapsulating a first message from the first network device via the first wireless connection;
extract the first message by performing the first decryption operation on the first encrypted link layer frame using the first security key;
encapsulate a second message in a second link layer frame;
generate a second encrypted link layer frame by performing the first encryption operation on the second link layer frame using the first security key; and
transmit the second encrypted link layer frame encapsulating the second message to the first network device via the first wireless connection.

21. The non-transitory computer-readable medium of claim 20, further comprising instructions that, when executed by the processor, causes the processor to:
encapsulate the first message in a third link layer frame;
generate a third encrypted link layer frame by performing the second encryption operation on the third link layer frame using the second security key;
transmit the third encrypted link layer frame encapsulating the first message to the second network device via the second wireless connection;
receive a fourth encrypted link layer frame encapsulating the second message from the second network device via the second wireless connection; and
extract the second message by performing the second decryption operation on the fourth encrypted link layer frame using the second security key.

22. The non-transitory computer-readable medium of claim 20, wherein the first message includes sensor data.

23. The non-transitory computer-readable medium of claim 22, wherein the sensor data includes data generated by a humidity sensor, a temperature sensor, acceleration sensor, light sensor, sound sensor, current sensor, global positioning system sensor, voltage sensor, or a combination thereof.

24. The non-transitory computer-readable medium of claim 19, wherein the first and second wireless connections are part of a wireless mesh network.

25. The non-transitory computer-readable medium of claim 19, further comprising instructions that, when executed by the processor, causes the processor to:
perform the at least one of the first encryption operation or the first decryption operation using the first security key on first data transmitted over the first wireless connection; and
perform the at least one of the second encryption operation or the second decryption operation using the second security key on second data transmitted over the second wireless connection.

* * * * *